PATENTED NOV. 11, 1830.
J. THORP.
6245X
MACHINERY FOR SPINNING AND IN SPINNING COTTON YARNS.
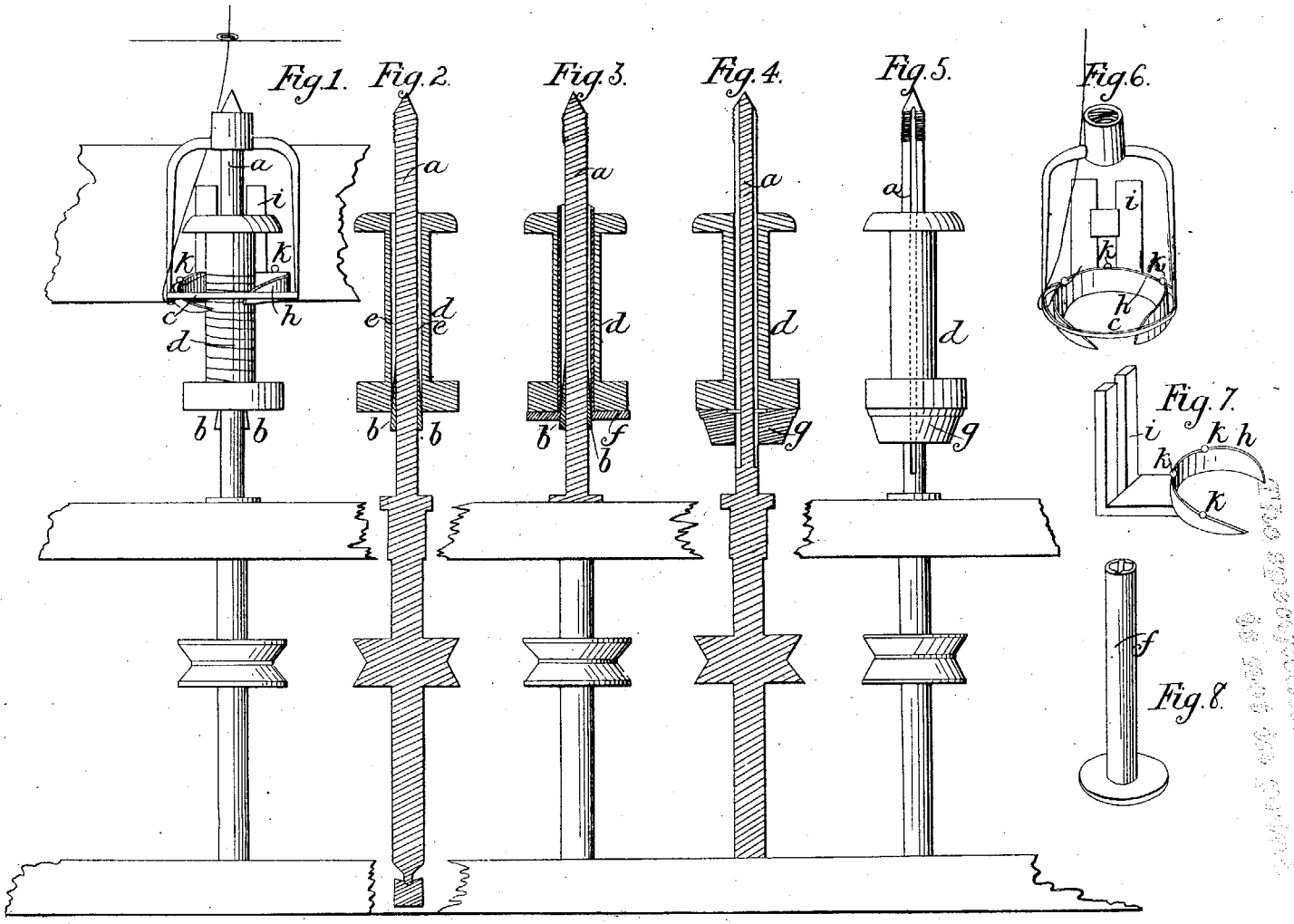
THE NORRIS PETERS CO., PHOTO-LITHO., WASHINGTON, D. C.

X6245 [illegible] 1830

Nov 11, 1830

John Thorp of Providence Rhode Island.

Letters Patent.

The schedule referred to in these Letters Patent and making part
of the same containing a description in the words of the said John Thorp
himself of his improvement for spinning ^and in Spinning^ cotton Yarn Be it known that I John Thorp of Providence in the county of
Providence & State of Rhode Island &c have invented constructed
made and applied to use, new and useful improvements in machi-
nery for spinning and in spinning cotton yarn, being improvements 13
on my ruining cap spinner patented on thirtieth day of June A.D.
1829. by which is produced a new mode of obstructing the revolving
progress of the yarn, causing it to fall back of the cap, and wind
upon the bobbin. The spindle used is the common throstle
spindle; two projecting lips are affixed to that part of it where the
bobbin usually traverses. These lips are on opposite sides of the spin
-dle; are parallel with it, and project about the sixteenth of an
inch. they extend up no farther than the face of the bobbin, when
at its highest position, and there should be length enough to the spin
-dle above them to allow the bobbin to be raised above them, so as to
turn on the spindle for the purpose of yielding the yarn for piecing &c,
The common throstle flyer is converted into what I call a cap, by
affixing to the lower extremity of its arms, in a horizontal position a
ring called the connecting ring sufficiently large to allow the bobbin
to traverse up and down through it, This ring guides the yarn to,
and distributes it on the bobbin. The yarn is not connected with
the cap, but is left to revolve around its surface. The bobbin used
is the common throstle bobbin, with a channel or groove formed
on each side of its perforation in which the above described lips
of the spindle traverse, and by which the bobbin is made to turn

[illegible] X 6245 with the spindle; or there may be to each spindle, a tube of the length of the
bobbin, in which the said channels or grooves may be formed, having a
large head or collar at the bottom on which the bobbin will loosely
set. This tube may be made of sheet iron and not entirely closed,
and brazed to a head or collar of the same. In this case the opening
in the side of the tube, will answer for one channel or groove, and the
other channel or groove, and one of the lips on the spindle, may be
dispensed with. the friction of the base of the bobbin on this head or collar
will be sufficient to give motion to the bobbins, and the bobbin being
allowed to turn on said tube, will at any time yield the yarn, when
it is necessary it should, be drawn from it, as in piecing the ends
&c. Or instead of said lips, on the spindle, grooves or channels may
be made in it, and a collar used to give motion to the bobbins. X
This collar should be about the size of the base of the bobbin and
made to slide loosely on the spindle. From the sides of its perforation
two lips project inward, and into the channels or grooves in the spindle
causing the collar to turn with the spindle But the principal improvement consist in a stationary spiral
lip or rim, that I call the check. The upper edge of the check
is within the connecting ring, one end, or part of this check is placed,
and remains above this ring, while the other end remains below it The space between the inside of this ring and the outside of the
check, should be large enough to allow the yarn to revolve freely
in it. The friction or tension requisite to wind the yarn upon the
bobbin, is produced by the upper edge of the check, over which the
yarn is drawn or compelled to pass at every turn of the spindle.

The check is a thin piece of metal, bent flatwise forming a curve
corresponding with a circle less in diameter than that of the ring.

It is fastened to a knee that is bolted or otherwise fastened to a
fixed bar or rail that stretches along the spinning frame back
of the spindles. By means of a slot or mortise in said knee
the check can be raised or lowered at pleasure varying its upper
edge more or less above the bottom of the connecting ring and pro- -ducing

X6245 197 more or less angle in the yarn, consequently increasing or diminishing the friction or tension of the yarn, and winding it more or less tight on the bobbin; said check should extend half way round the bobbin though a greater or less proportion may answer the purpose Small polished notches or protuberances on the upper edge of the check, will produce an increased tension on the yarn. The yarn passes down on the outside of the connecting ring, or lower edge of the cap, then up between said ring and the check and over the upper edge of the check to the bobbin.

Among the several improvements above described there is but one, in which I claim an exclusive property, and that is the check as afore described, by which the progress of revolving the yarn is obstructed, the yarn made to fall back of the cap and to wind on the bobbin Providence R. I. Nov^r 1^st 1830

Witnesses
Levi Curtis Eaton
William R. Stapley

John Thorp

1002

Exd
H.G.L